United States Patent [19]

Moretz et al.

[11] Patent Number: 5,401,453
[45] Date of Patent: Mar. 28, 1995

[54] METHOD OF FORMING A VEHICLE WINDOW FRAME WITH A SEAL INSERT

[75] Inventors: Ralph D. Moretz, Jackson; Richard D. Lopez, Shelby Township, Macomb County, both of Mich.; Jerry L. Wolf, Wharton, Ohio; Michael P. Koval, Southfield, Mich.

[73] Assignees: Mid-American Products, Inc., Jackson; Guardian Industries Corporation, Northville, both of Mich.

[21] Appl. No.: 18,720

[22] Filed: Feb. 17, 1993

[51] Int. Cl.⁶ .................... B29C 45/14; B29C 45/16
[52] U.S. Cl. ........................... 264/161; 264/250; 264/273; 264/274
[58] Field of Search ............. 264/250, 273, 274, 275, 264/255, 294, 161, 163

[56] References Cited

U.S. PATENT DOCUMENTS

| | | | |
|---|---|---|---|
| 4,119,325 | 10/1978 | Oakley et al. | 277/207 |
| 4,495,740 | 1/1985 | Sarrazin et al. | 264/273 |
| 4,732,724 | 3/1988 | Sterner | 264/273 |
| 4,842,540 | 6/1989 | Endo et al. | 264/273 |
| 4,903,997 | 2/1990 | Kifer | 264/255 |
| 4,953,907 | 9/1990 | Sugita | 296/93 |
| 5,053,178 | 10/1991 | Butlin et al. | 264/275 |
| 5,078,444 | 1/1992 | Shirahata et al. | 296/93 |
| 5,083,835 | 1/1992 | Rossini | 296/201 |
| 5,085,021 | 2/1992 | Kunert | 52/208 |
| 5,091,131 | 2/1992 | Schomacher et al. | 264/266 |
| 5,106,565 | 4/1992 | Saitoh | 264/268 |
| 5,136,773 | 8/1992 | Mesne et al. | 264/296 |

*Primary Examiner*—Jan H. Silbaugh
*Assistant Examiner*—Angela Ortiz
*Attorney, Agent, or Firm*—Beaman & Beaman

[57] ABSTRACT

A vehicle tilt-out window with a resilient seal insert includes an annular frame which is bonded to the vehicle window opening. The frame includes a resilient double lip seal which is molded into a recess formed in the frame and the lip seal cooperates with a glass panel mounted upon the frame by homogeneous hinge tabs extending from the frame permitting the glass panel to be tilted relative to the frame for ventilation purposes and an articulated pivoting latch mounted to a homogeneous latch base locks the glass panel against the lip seal.

2 Claims, 2 Drawing Sheets

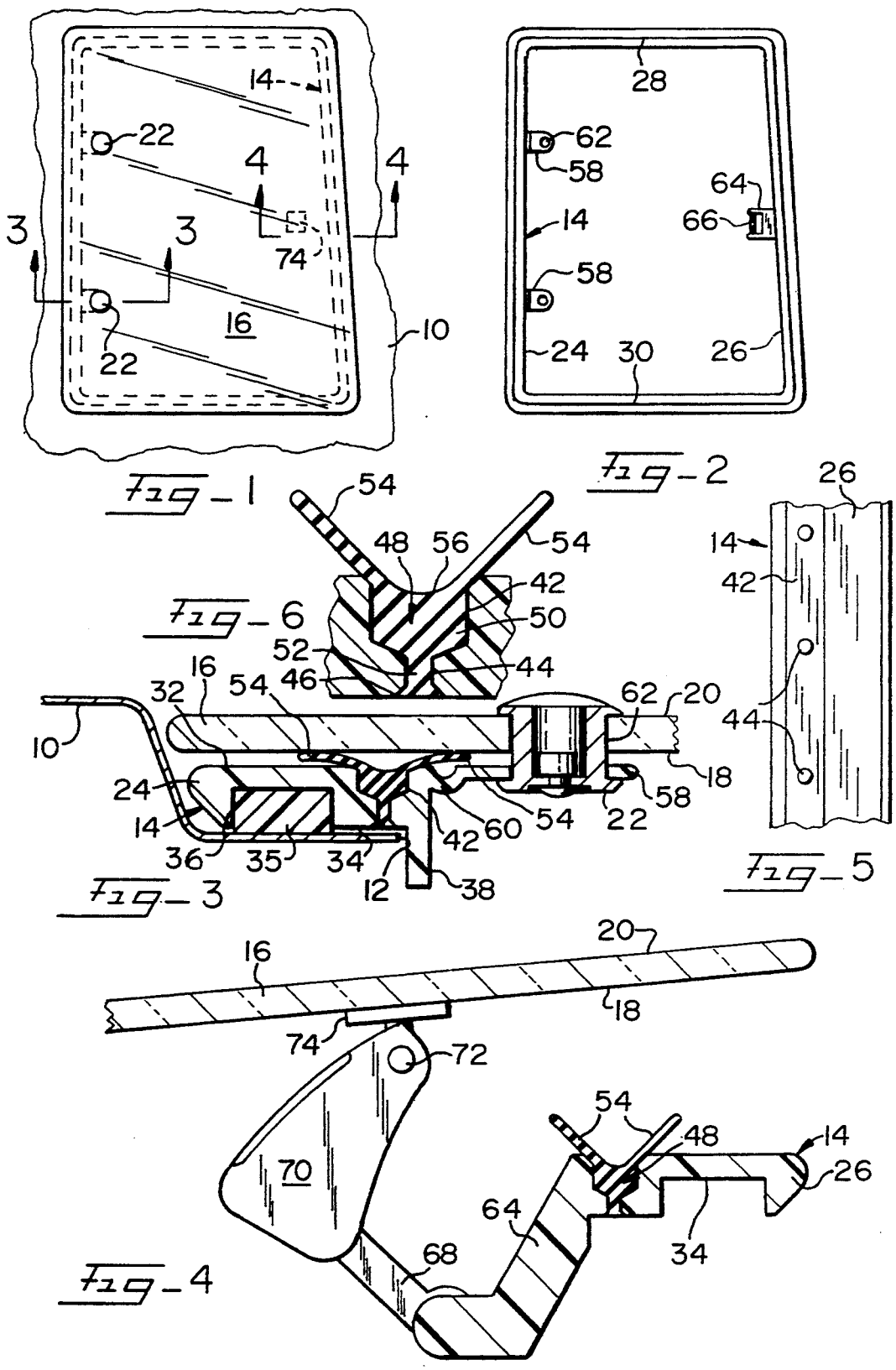

METHOD OF FORMING A VEHICLE WINDOW FRAME WITH A SEAL INSERT

BACKGROUND OF THE INVENTION

1. Field of the Invention

The invention pertains to the method of forming a vehicle tilt-out window of a synthetic plastic material by molding wherein a resilient lip seal is molded within a pre-formed frame to form an intregal assembly. Homogeneous hinge tabs are defined upon the frame for supporting a glass panel which sealingly engages the seal and a linkage operator is used to hold the glass panel against the seal, and tilt the window outwardly for ventilation purposes.

2. Description of the Related Art

Vehicles, particularly pickup truck cabs and vans, often use a tilt-out window for ventilation purposes.

Such tilt-out windows are usually formed by attaching a glass panel by means of pivoting or spring type hinges riveted or bolted to the vehicle sheet metal construction. A glass panel is connected at the forward edge of the panel to the window frame by the hinge structure, and the rear edge of the glass panel is pivoted inwardly and outwardly by means of a over-center linkage mechanism, the base of which is riveted or bolted to the vehicle sheet metal structure. The window is maintained in its locked position, and in its extended venting position, by the linkage.

A water tight seal between the glass panel and the window frame is achieved by a resilient seal mounted upon the edges of the window opening in the vehicle body. The seal is formed of a resilient rubber or rubber-like material, and is usually bonded directly to the outer vehicle body adjacent to the opening by adhesives, or is framed in such a way as to permit it to be slipped over the edges of the window opening and retained without adhesives.

Tilt-out windows of the aforedescribed type are expensive to manufacture and assemble in that the assembly of the seal to the window opening requires the application of adhesive to the seal, or careful application of a seal or an accurate assembly of a seal designed to slip over the opening edge. Also, this type of tilt-out window is subject to seal failure in the event the seal "pops out" of the frame recess due to the failure of the adhesive or the slip-over retention. This type of seal also includes a joint at the two ends of the extruded seal, presenting a leak path.

Further, conventional vehicle tilt-out windows require expensive hinge structure and assembly techniques, and often include "custom" placing of the hinges and latch base in order to compensate for irregularities in the sheet metal structure, and such assembly costs significantly add to the expense of the finished product.

SUMMARY OF THE INVENTION

It is an object of the invention to provide a method for forming a vehicle tilt-out window module wherein a resilient seal is molded into a recess defined in a pre-formed frame.

Another object of the invention is to provide a vehicle tilt-out window frame formed of a substantially rigid synthetic plastic material wherein a flexible elastic seal is molded into the frame to form an intregal assembly whose seal is continuous or "jointless".

Yet another object of the invention is to provide a vehicle tilt-out window frame of substantially rigid synthetic plastic material having a resilient flexible seal molded therein, and frame holes receiving the seal material aid in the retention of the seal within the frame.

A further object of the invention is to provide a vehicle tilt-out frame which includes homogeneously molded hinge tabs and a latch base, eliminating the need for separate hinge and latch base components.

In the practice of the invention, an annular semi-rigid synthetic plastic frame is injection molded of a configuration as desired. The frame configuration includes an outwardly facing recess extending about the entire configuration of the frame, and upon its inner side the frame will include recesses and other configurations for receiving bonding material, or seals, for attaching the frame to the vehicle opening. The recess formed in the frame outer side includes a plurality of sprue holes intersecting the frame inner side and recess whereby the seal material may be injected into the recess.

After the semi-rigid window frame is formed and removed from its mold, the frame is inserted into another set of injection molding dies and a resilient flexible seal material is injected into the frame recess through the sprue holes. The dies include thin recesses for forming a double lip seal extending from the frame recess which diverge outwardly. In this manner, a flexible double lip seal is intregally assembled to the frame and an intimate contact occurs between the seal and frame due to the mold-in-place that has occurred in defining the seal. As the seal material is located within the sprue holes, the sprue holes also aid in retaining the seal within its groove. Such intregal forming of the seal and frame eliminates subsequent assembly procedures reducing assembly costs, as well as providing a superior seal and frame assembly.

The modular assembly is attached to the vehicle sheet metal structure in a closed position by use of adhesives wherein the optimum sealing position of the glass panel in its cooperation with the resilient double lip seal is maintained during the bonding process, allowing the bonding material to compensate for sheet metal irregularities. In this way the sheet metal irregularities are prevented from being transferred to the seal, compromising the seal between the seal lips and the glass panel.

The frame also includes homogeneous hinge tabs which extend toward the opposite side of the frame. The glass panel associated with the frame is affixed to the hinge tabs, and the hinge tabs, though formed of the semi-rigid material of the frame, are capable of the limited deflection necessary to accommodate the movement of the glass panel between open and closed positions.

Also, the pivoted operating linkage for the window is mounted upon a homogeneous latch support formed during the molding of the window frame.

BRIEF DESCRIPTION OF THE DRAWING

The aforementioned objects and advantages of the invention will be appreciated from the following description and accompanying drawings wherein:

FIG. 1 is an elevational view of a vehicle tilt-out window in accord with the invention as viewed from the exterior, FIG. 2 is an elevational view of the window frame, per se, FIG. 3 is an enlarged detail elevational sectional view taken through a hinge tab along Section 3—3 of FIG. 1, FIG. 4 is an enlarged elevational detail sectional view of the operating linkage as taken along Section 4—4 of FIG. 1, the vehicle body structure not being illustrated, FIG. 5 is an enlarged detail elevational view of the window frame prior to the molding of the seal in place, FIG. 6 is an enlarged elevational detail view of the resilient seal as received within the frame recess.

DESCRIPTION OF THE PREFERRED EMBODIMENT

Figure 7:
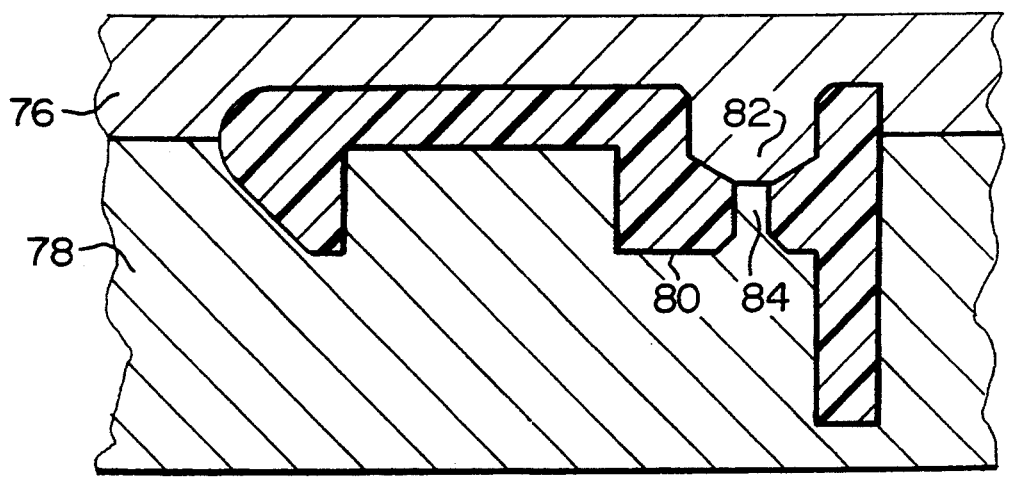
FIG. 7 is a detail elevational sectional view of the mold, cavity, and window frame formed thereby.

The tilt-out window frame of the invention is usually employed as a side vent window in a truck cab or van body. In FIGS. 1 and 3, the vehicle sheet metal body is represented at 10 and includes a window opening 12 of the desired configuration. The window frame 14 mounts within the opening 12, as later described, and a window glass panel 16 is supported upon the window frame in a pivotal manner for movement between open and closed positions. The glass panel 16 includes an inner side 18, an outer side 20, and is attached to the window frame hinge tabs by bolts 22.

The window frame 14 is of an annular generally rectangular configuration, and of course, is shaped to conform to the window opening 12 defined in the vehicle body. The window frame 14 is injection molded, as later described, and is formed of a thermoplastic such as reinforced polyethylene, polyester, polyamide, etc. wherein the frame is of a substantially rigid character. Preferably, the reinforcement comprises a minimum of 30% glass by volume. The frame includes a forward lateral side 24, FIG. 2, and a rear lateral side 26, disposed toward the rear of the associated vehicle. The upper end of the frame is referenced at 28, while the lower end 30 interconnects the lower ends of the frame lateral portions. The frame includes an outer side 32 disposed toward the glass panel 16, and an inner side 34 disposed toward the vehicle body and window opening 12.

A recess 36 is defined in the frame inner side throughout the frame configuration, and an adhesive 35, such as Santaprenes or other urethane adhesive, received within recess 36 attaches the window frame 14 upon the vehicle body and within the vehicle opening 12. The window frame includes an extension 38, FIG. 3, which is disposed adjacent the window opening 12 to cover or "dress" the edges of the window opening.

A recess 42 is defined in the window frame outer side 32, and a plurality of sprue holes 44 intersect the recess and the frame inner side 34 as will be appreciated from FIGS. 3–6. The sprue holes are countersunk at 46.

As later described, a flexible resilient seal 48 formed of a rubber type material such as thermoplastic rubber, or other thermoplastic or cure type elastomer, is located within recess 42, and the seal includes a seal base 50 filling the recess 42. A sprue stem 52 extends from the base 50 into the holes 44 and countersunk or counterbored portions 46, and the seal includes outwardly extending lips 54 which diverge away from each other in the outward direction and intersect at the concave intersection 56, FIG. 6. The lips 54 are flexible and directly engage with the glass panel 16 as appreciated from FIG. 3. The lips as engaged with the glass panel are disposed in such a way that the exposed areas opposite the glass cause the lips to engage more forcefully with the glass in the presence of a positive pressure differential from its respective side on the seal.

A pair of hinge tabs 58 are homogeneously defined on the window frame forward side 24, FIGS. 2 and 3, and extend toward side 26. The hinge tabs each include an offset portion 60, FIG. 3, which aids in the flexing of the hinge tabs, and each hinge tab is provided with a hole 62 for receiving a hinge bolt 22. In this manner, the glass panel 16 is attached to the window frame 14 in a hinged or pivotal manner at the forward edge of the glass panel with respect to the direction of vehicle travel.

A latch base 64 is homogeneously defined on the window frame rear side 26, FIGS. 2 and 4, and the latch base 64 includes a pin portion 66 extending between the legs of the latch, FIG. 2. A link 68 is hinged to the pin 66, and the link 68 is pivotally attached to the handle 70, FIG. 4. The handle 70 is pivotally mounted by pivot 72 to the anchor 74 which is bonded to the glass panel inner side 18, or attached by screws through a hole in the glass, FIG. 4. The latch base 64, link 68, and handle 70 constitute an over-center linkage well known in this type of installation whereby the handle 70 may be pivoted in such a manner as to draw the rear portion of the glass panel 16 toward the window frame rear lateral side 26 such that the glass inner side 18 will engage and deform the seal lips 54 in the manner shown in FIG. 3. The glass panel 16 may be tilted opened by pivoting the handle 70 in the opposite direction separating the rear portion of the glass panel from the rear portion of the window frame seal lips 54. The degree of movement of the glass panel between its opened and closed positions is limited, usually in the neighborhood of two inches.

The pivots of the link 68 and handle 70 are such that an over-center relationship exists when the handle is pivoted to its open and closed positions to thereby "lock" the glass panel in its open and closed conditions.

Figure 8:
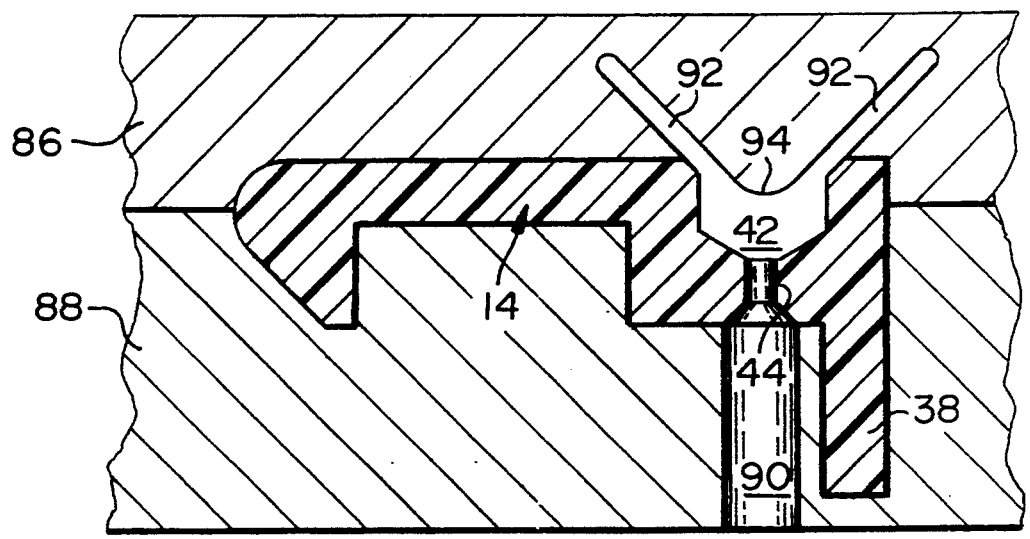
FIG. 8 is an elevational sectional detail view of the molds used to form the elastic seal, the frame being located in place, and prior to the injection of the flexible seal material.
Figure 9:
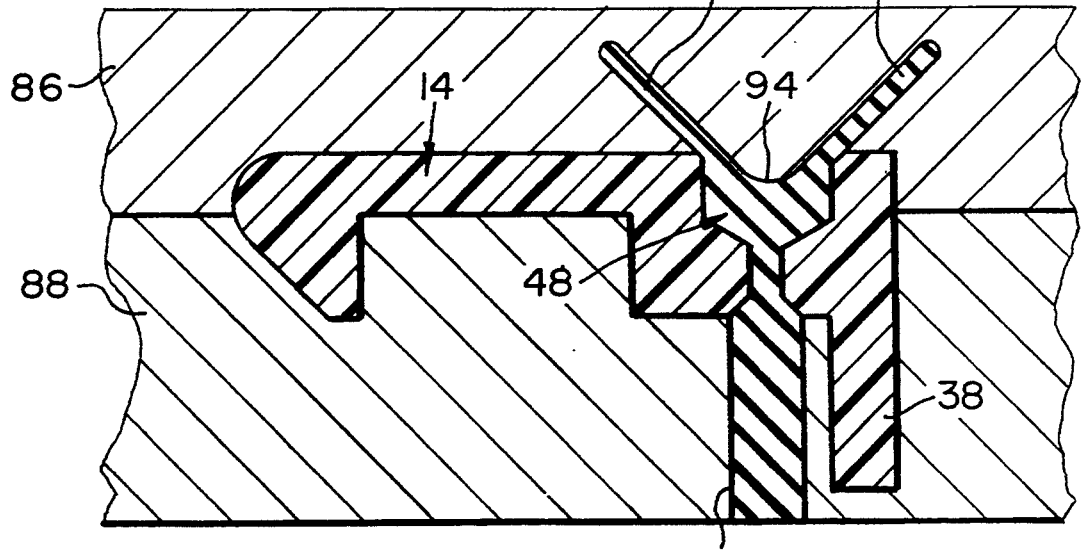
FIG. 9 is a view similar to FIG. 8 after the seal material has been injected through the sprue openings.

An important aspect of the invention lies in the assembly of the seal 48 to the window frame 14. In accord with the invention, the seal is molded within the window frame so as to eliminate any secondary assembly operations. The "molded-in-place" method also allows the seal to be molded without gaps or joints, and perfectly shaped to conform to the required configuration. The method of forming the window frame is best appreciated from FIGS. 7–9.

In FIG. 7, an upper injection mold die is represented at 76 while the lower die is shown at 78. A cavity 80 is defined in the lower die 78 corresponding to the frame inner side 34, and the upper die 76 includes a projection 82 for forming the window frame recess 42. A plurality of lower die mounted cylindrical projections 84 align with the projection 82 to form the sprue and retention holes 44. Accordingly, the window frame, including the hinge tabs 58 and the latch base 64 is injection molded within the dies 76 and 78.

After the window frame has cooled, the window frame 14 is removed from dies 76 and 78 and is located within a complementary recess defined between an upper injection mold die 86 and a lower die 88. The lower die 88 includes a sprue passage 90 in alignment with the window frame sprue holes 44, and the upper die 86 is formed with thin recesses or portions 92 which form the seal lips 54. A valley 94 is defined in the die 86 for forming the concave lip intersection between the lips 54.

Upon the window frame 14 being located within the dies 86 and 88, the flexible thermoplastic material forming the seal 48 is injected through the sprue passages 90 and the sprue holes 44 into the recess 42 and the passages 90. In this manner, the seal 48 is formed in place within the window frame recess 42, and upon removal of the window frame and seal assembly shown in FIG. 9 from the die halves 86 and 88, the sprue is severed at the countersink 46, and the assembly of the window frame and seal is completed. During the injection molding and formation of the seal 48 some of the holes 44 are used to aid in the venting of air and entrapped gases during the injection molding.

The molding of the seal 48 into the window frame recess 42 eliminates secondary assembly procedures, produces superior bonding and attachment between the seal and window frame, and results in a superior product as compared to window frames wherein the seal structure is separately assembled thereto. In addition to the bonding that may occur between the seal material and window frame within recess 42, the presence of the seal material within the sprue holes 44, and in the countersinks 46 further aids in resisting removal of the seal from the window frame.

It is appreciated that various modifications to the inventive concepts may be apparent to those skilled in the art without departing from the spirit and scope of the invention.

We claim:

1. The method of forming a vehicle window frame of moldable synthetic plastic having an integral resilient lip seal, the frame supporting a glass panel pivotal relative to the frame between open and closed positions and sealed to the frame by the lip seal in the closed position, comprising the steps of:

(a) molding a frame of a substantially rigid synthetic plastic material in a first mold to define a frame periphery having an outer side and an elongated recess defined in the outer side, a plurality of sprue holes being defined in said frame in communication with said recess each having an inlet end located remotely from said recess, (b) removing the frame from the first mold, (c) inserting the frame in a second mold having a resilient lip seal configuration cavity in alignment and communication with the frame recess, (d) injecting a flexible seal material into said recess and cavity through said sprue holes to define a flexible lip seal extending from the frame recess and outer side, said flexible seal material filling said sprue holes, (e) cooling said flexible seal, (f) removing the integrated frame and seal from said second mold, and (g) severing said seal material adjacent said sprue hole inlet ends whereby the seal material within said sprue holes aids in retaining said seal within said recess.

2. The method of forming a vehicle window frame as in claim 1 wherein said seal configuration cavity includes a pair of thin portions obliquely angularly related to each other whereby the formed seal includes a pair of flexible sealing lips as defined by said thin portions.

* * * * *